United States Patent
Kakkar et al.

(10) Patent No.: US 10,243,803 B2
(45) Date of Patent: Mar. 26, 2019

(54) SERVICE INTERFACE TOPOLOGY MANAGEMENT

(71) Applicant: International Business Machines Corporation, Armonk, NY (US)

(72) Inventors: Gaurav Kakkar, Bangalore (IN); Santosh S. Puranik, Bangalore (IN); Jinu J. Thomas, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 57 days.

(21) Appl. No.: 15/224,488

(22) Filed: Jul. 29, 2016

(65) Prior Publication Data

US 2018/0034704 A1    Feb. 1, 2018

(51) Int. Cl.
*H04L 12/24*     (2006.01)
*H04L 12/725*    (2013.01)
*H04L 12/707*    (2013.01)

(52) U.S. Cl.
CPC .......... *H04L 41/12* (2013.01); *H04L 41/0668* (2013.01); *H04L 41/0816* (2013.01); *H04L 45/22* (2013.01); *H04L 45/306* (2013.01)

(58) Field of Classification Search
CPC . H04L 41/0668; H04L 41/0816; H04L 41/12; H04L 45/22; H04L 45/306
See application file for complete search history.

(56) References Cited

U.S. PATENT DOCUMENTS

| | | |
|---|---|---|
| 7,003,700 B2 | 2/2006 | Elko et al. |
| 7,526,639 B2 | 4/2009 | Duron et al. |
| 7,734,947 B1 | 6/2010 | Frangioso |
| 8,184,526 B2 | 5/2012 | Duncan |
| 8,681,601 B1 * | 3/2014 | Dalvi .................. G06F 11/2007 370/216 |
| 8,799,702 B2 | 8/2014 | Buckland et al. |
| 9,813,286 B2 | 11/2017 | Fang |
| 2003/0188222 A1 | 10/2003 | Abbondanzio et al. |
| 2004/0073834 A1 * | 4/2004 | Kermaani ........... G06F 11/2028 714/13 |
| 2005/0019031 A1 * | 1/2005 | Ye ........................ H04B 10/077 398/19 |
| 2008/0052384 A1 * | 2/2008 | Marl .................. H04L 12/2807 709/223 |
| 2010/0185896 A1 | 7/2010 | Andres et al. |

* cited by examiner

*Primary Examiner* — Mohamed A Kamara
(74) *Attorney, Agent, or Firm* — Isaac J. Gooshaw

(57) ABSTRACT

Disclosed aspects relate to service interface topology management for a shared pool of configurable computing resources. A management engine may detect a first linkage error event for a first set of data traffic with respect to a first service interface cable which connects a first global service processor with a set of hardware devices. A second service interface cable which connects a second global service processor with the set of hardware devices may be sensed. Based on and in response to the first linkage error event for the first set of data traffic, the management engine may determine to access the set of hardware devices by utilizing the second service interface cable. The first set of data traffic may be routed to the set of hardware devices via the second service interface cable.

18 Claims, 7 Drawing Sheets

SERVICE INTERFACE TOPOLOGY MANAGEMENT

BACKGROUND

This disclosure relates generally to computer systems and, more particularly, relates to service interface topology management for a shared pool of configurable computing resources. Service interface topology may be desired to be performed as efficiently as possible. The number of hardware components in server systems that need to be managed by enterprises is increasing. As the number of hardware components in servers systems continues to increase, the need for efficient management of data traffic for those hardware components may increase.

SUMMARY

Aspects of the disclosure relate to utilizing a redundant cable of a secondary service processor to access a hardware device when there is failure of a primary cable that carries field-replaceable-unit service interface (FSI) links of a primary service processor. The FSI links of the primary secondary service processor may be rerouted through the redundant cable in order to reduce failover of the primary service processor. The primary service processor may detect an issue with at least one link of an FSI cable that connects the primary service processor with one or more hardware components. In response to detecting the issue, the primary service processor may transmit a remote request to a secondary service processor to access the hardware components. The secondary service processor may access the hardware components using its FSI cable, and return the results to the primary service processor for processing. Leveraging FSI link redundancy may facilitate efficient management of service processors and other hardware components as well as reduce the need for failover operations.

Disclosed aspects relate to service interface topology management for a shared pool of configurable computing resources. A management engine may detect a first linkage error event for a first set of data traffic with respect to a first service interface cable which connects a first global service processor with a set of hardware devices. A second service interface cable which connects a second global service processor with the set of hardware devices may be sensed. Based on and in response to the first linkage error event for the first set of data traffic, the management engine may determine to access the set of hardware devices by utilizing the second service interface cable. The first set of data traffic may be routed to the set of hardware devices via the second service interface cable.

The above summary is not intended to describe each illustrated embodiment or every implementation of the present disclosure.

BRIEF DESCRIPTION OF THE SEVERAL VIEWS OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
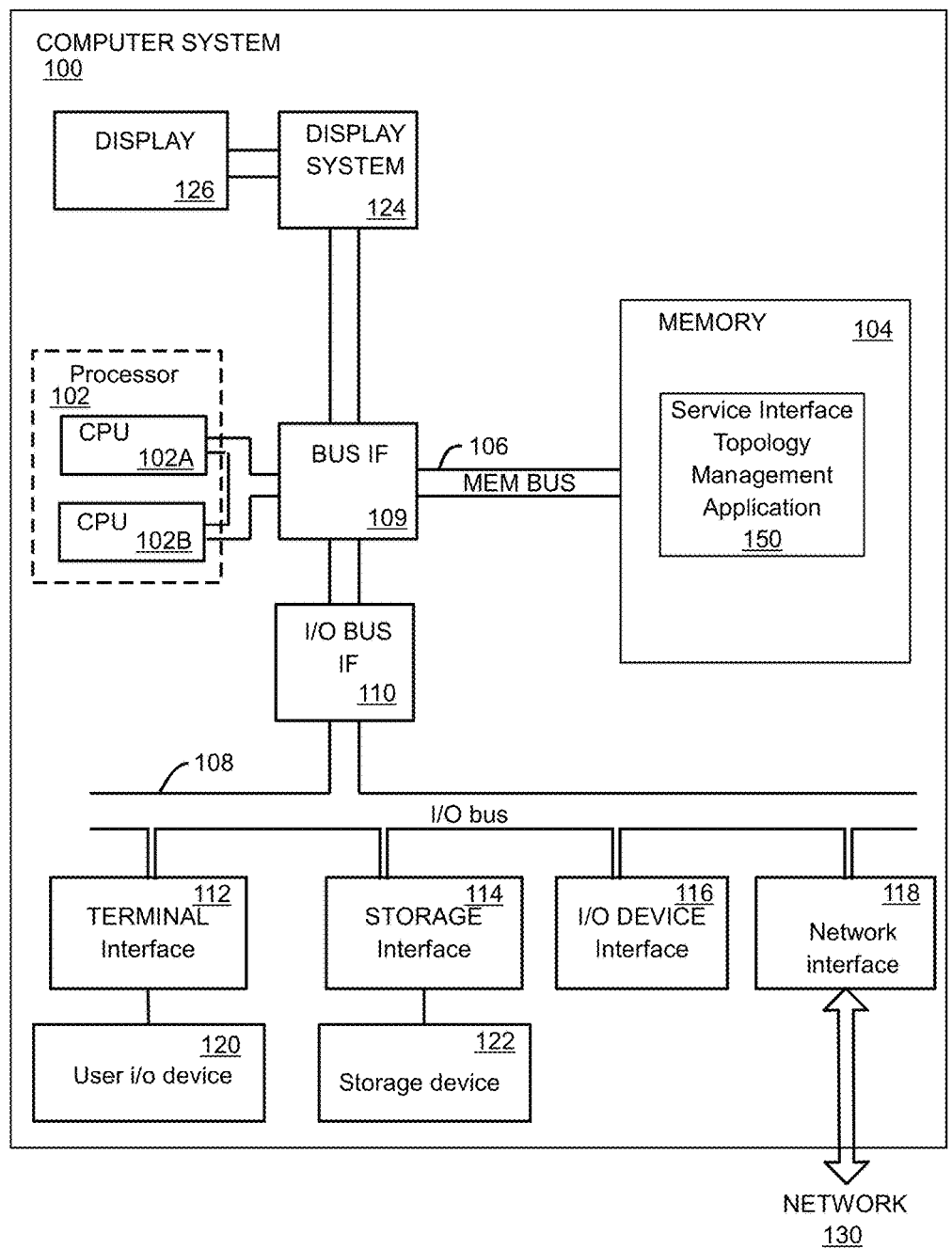
FIG. 1 depicts a high-level block diagram of a computer system for implementing various embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the disclosure relate to utilizing a redundant cable of a secondary service processor to access a hardware device when there is failure of a primary cable that carries field-replaceable-unit service interface (FSI) links of a primary service processor. The FSI links of the primary secondary service processor may be rerouted through the redundant cable in order to reduce failover of the primary service processor. The primary service processor may detect an issue with at least one link of an FSI cable that connects the primary service processor with one or more hardware components. In response to detecting the issue, the primary service processor may transmit a remote request to a secondary service processor to access the hardware components (e.g., on behalf of the primary service processor). The secondary service processor may access the hardware components using its FSI cable, and return the results to the primary service processor for processing. Leveraging FSI link redundancy may facilitate efficient management of service processors and other hardware components as well as reduce the need for failover operations.

As the complexity of server systems continues to increase, maintaining stable communication connections between service processors and individual hardware devices of the network environment is one important aspect of service interface topology management. Server systems often include a primary service processor and one or more secondary service processors that each have separate cables (service interface cables) to carry their service interface (FSI) links and maintain communication with individual hardware devices. In some situations, an FSI link of a particular service interface cable may encounter an error (e.g., broken/bent connection pin), resulting in limited or impaired communication between the service processor (e.g., first service processor) and one or more hardware devices. Accordingly, aspects of the disclosure relate to utilizing the service interface cable of another service processor (e.g., second service processor) that maintains a functional connection with the hardware devices to facilitate network communication between the first service processor and the hardware devices. Aspects of the disclosure may be associated with server system reliability, network flexibility, and a reduced need for service processor failover operations.

Aspects of the disclosure include a method, system, and computer program product for service interface topology management for a shared pool of configurable computing resources. In embodiments, the service interface typology management may benefit a failover rate of global service processors. Aspects of the disclosure relate to detecting a first linkage error event for a first set of data traffic with respect to a first service interface cable which connects a first global service processor with a set of hardware. The first linkage error event may be detected by a management engine. The management engine may sense a second service interface cable which connects a second global service processor with the set of hardware devices. The first and second global service processors may be connected. The second global service processor may be called to access the set of hardware devices on behalf of the first global service processor. The management engine may resolve that the first service interface cable is not undergoing a replacement operation. Based on and in response to the first linkage error event for the first set of data traffic, the management engine may access the set of hardware devices by utilizing the second service interface cable. The first set of data traffic may be routed to the set of hardware devices by the management engine via the second service interface cable. In embodiments, the first set of data traffic may be all data traffic, and routing the first set of data traffic to the set of hardware devices via the second service interface cable may facilitate a fix action to the first service interface cable without executing a failover operation. In embodiments, the service interface topology management may be carried-out without executing a failover operation.

Aspects of the disclosure relate to detecting a second linkage error event for a second set of data traffic with respect to the second interface cable which connects the second global service processor with the set of hardware devices. The second linkage error event may be detected by the management engine. In embodiments, the first and second linkage error events may achieve a non-overlap threshold. Based on and in response to the second linkage error event for the second set of data traffic, the management engine may determine to access the set of hardware devices by utilizing the first service interface cable. In embodiments, a group of data traffic may be allocated into the first and second sets of data traffic to access the set of hardware devices by utilizing both the first and second service interface cables. The management engine may route the second set of data traffic to the set of hardware devices via the first service interface cable. In embodiments, at least a portion of the set of hardware devices may be inaccessible by both the first and second global service processors without splitting the group of data traffic.

Aspects of the disclosure relate to detecting a second linkage error event for a second set of data traffic with respect to the second service interface cable which connects the second global service processor with the set of hardware devices. The second linkage error event may be detected by the management engine. Based on and in response to the second linkage error event for the second set of data traffic, the management engine may determine that the first and second linkage error events match. The management engine may provide an error notification. In embodiments, service interface topology management for a shared pool of configurable computing resources may be associated with performance or efficiency benefits (e.g., data security, reduced failover rate, speed, flexibility, network responsiveness, resource usage, productivity). Aspects may save resources such as bandwidth, processing, or memory.

Turning now to the figures, FIG. 1 depicts a high-level block diagram of a computer system for implementing various embodiments of the present disclosure, consistent with various embodiments. The mechanisms and apparatus of the various embodiments disclosed herein apply equally to any appropriate computing system. The major components of the computer system 100 include one or more processors 102, a memory 104, a terminal interface 112, a storage interface 114, an I/O (Input/Output) device interface 116, and a network interface 118, all of which are communicatively coupled, directly or indirectly, for inter-component communication via a memory bus 106, an I/O bus 108, bus interface unit 109, and an I/O bus interface unit 110.

The computer system 100 may contain one or more general-purpose programmable central processing units (CPUs) 102A and 102B, herein generically referred to as the processor 102. In embodiments, the computer system 100 may contain multiple processors; however, in certain embodiments, the computer system 100 may alternatively be a single CPU system. Each processor 102 executes instructions stored in the memory 104 and may include one or more levels of on-board cache.

In embodiments, the memory 104 may include a random-access semiconductor memory, storage device, or storage medium (either volatile or non-volatile) for storing or encoding data and programs. In certain embodiments, the memory 104 represents the entire virtual memory of the computer system 100, and may also include the virtual memory of other computer systems coupled to the computer system 100 or connected via a network. The memory 104 can be conceptually viewed as a single monolithic entity, but in other embodiments the memory 104 is a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures.

The memory 104 may store all or a portion of the various programs, modules and data structures for processing data transfers as discussed herein. For instance, the memory 104 can store a service interface topology management application 150. In embodiments, the service interface topology management application 150 may include instructions or statements that execute on the processor 102 or instructions or statements that are interpreted by instructions or statements that execute on the processor 102 to carry out the functions as further described below. In certain embodiments, the service interface topology management application 150 is implemented in hardware via semiconductor devices, chips, logical gates, circuits, circuit cards, and/or other physical hardware devices in lieu of, or in addition to, a processor-based system. In embodiments, the service interface topology management application 150 may include data in addition to instructions or statements.

The computer system 100 may include a bus interface unit 109 to handle communications among the processor 102, the memory 104, a display system 124, and the I/O bus interface unit 110. The I/O bus interface unit 110 may be coupled with the I/O bus 108 for transferring data to and from the various I/O units. The I/O bus interface unit 110 communicates with multiple I/O interface units 112, 114, 116, and 118, which are also known as I/O processors (IOPs) or I/O adapters (IOAs), through the I/O bus 108. The display system 124 may include a display controller, a display memory, or both. The display controller may provide video, audio, or both types of data to a display device 126. The display memory may be a dedicated memory for buffering video data. The display system 124 may be coupled with a display device 126, such as a standalone display screen, computer monitor, television, or a tablet or handheld device display. In one embodiment, the display device 126 may include one or more speakers for rendering audio. Alternatively, one or more speakers for rendering audio may be coupled with an I/O interface unit. In alternate embodiments, one or more of the functions provided by the display system 124 may be on board an integrated circuit that also includes the processor 102. In addition, one or more of the functions provided by the bus interface unit 109 may be on board an integrated circuit that also includes the processor 102.

The I/O interface units support communication with a variety of storage and I/O devices. For example, the terminal interface unit 112 supports the attachment of one or more user I/O devices 120, which may include user output devices (such as a video display device, speaker, and/or television set) and user input devices (such as a keyboard, mouse, keypad, touchpad, trackball, buttons, light pen, or other pointing device). A user may manipulate the user input devices using a user interface, in order to provide input data and commands to the user I/O device 120 and the computer system 100, and may receive output data via the user output devices. For example, a user interface may be presented via the user I/O device 120, such as displayed on a display device, played via a speaker, or printed via a printer.

The storage interface 114 supports the attachment of one or more disk drives or direct access storage devices 122 (which are typically rotating magnetic disk drive storage devices, although they could alternatively be other storage devices, including arrays of disk drives configured to appear as a single large storage device to a host computer, or solid-state drives, such as flash memory). In some embodiments, the storage device 122 may be implemented via any type of secondary storage device. The contents of the memory 104, or any portion thereof, may be stored to and retrieved from the storage device 122 as needed. The I/O device interface 116 provides an interface to any of various other I/O devices or devices of other types, such as printers or fax machines. The network interface 118 provides one or more communication paths from the computer system 100 to other digital devices and computer systems; these communication paths may include, e.g., one or more networks 130.

Although the computer system 100 shown in FIG. 1 illustrates a particular bus structure providing a direct communication path among the processors 102, the memory 104, the bus interface 109, the display system 124, and the I/O bus interface unit 110, in alternative embodiments the computer system 100 may include different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface unit 110 and the I/O bus 108 are shown as single respective units, the computer system 100 may, in fact, contain multiple I/O bus interface units 110 and/or multiple I/O buses 108. While multiple I/O interface units are shown, which separate the I/O bus 108 from various communications paths running to the various I/O devices, in other embodiments, some or all of the I/O devices are connected directly to one or more system I/O buses.

In various embodiments, the computer system 100 is a multi-user mainframe computer system, a single-user system, or a server computer or similar device that has little or no direct user interface, but receives requests from other computer systems (clients). In other embodiments, the computer system 100 may be implemented as a desktop computer, portable computer, laptop or notebook computer, tablet computer, pocket computer, telephone, smart phone, or any other suitable type of electronic device.

FIG. 1 depicts several major components of the computer system 100. Individual components, however, may have greater complexity than represented in FIG. 1, components other than or in addition to those shown in FIG. 1 may be present, and the number, type, and configuration of such components may vary. Several particular examples of additional complexity or additional variations are disclosed herein; these are by way of example only and are not necessarily the only such variations. The various program components illustrated in FIG. 1 may be implemented, in various embodiments, in a number of different manners, including using various computer applications, routines, components, programs, objects, modules, data structures, etc., which may be referred to herein as "software," "computer programs," or simply "programs."

Figure 2:
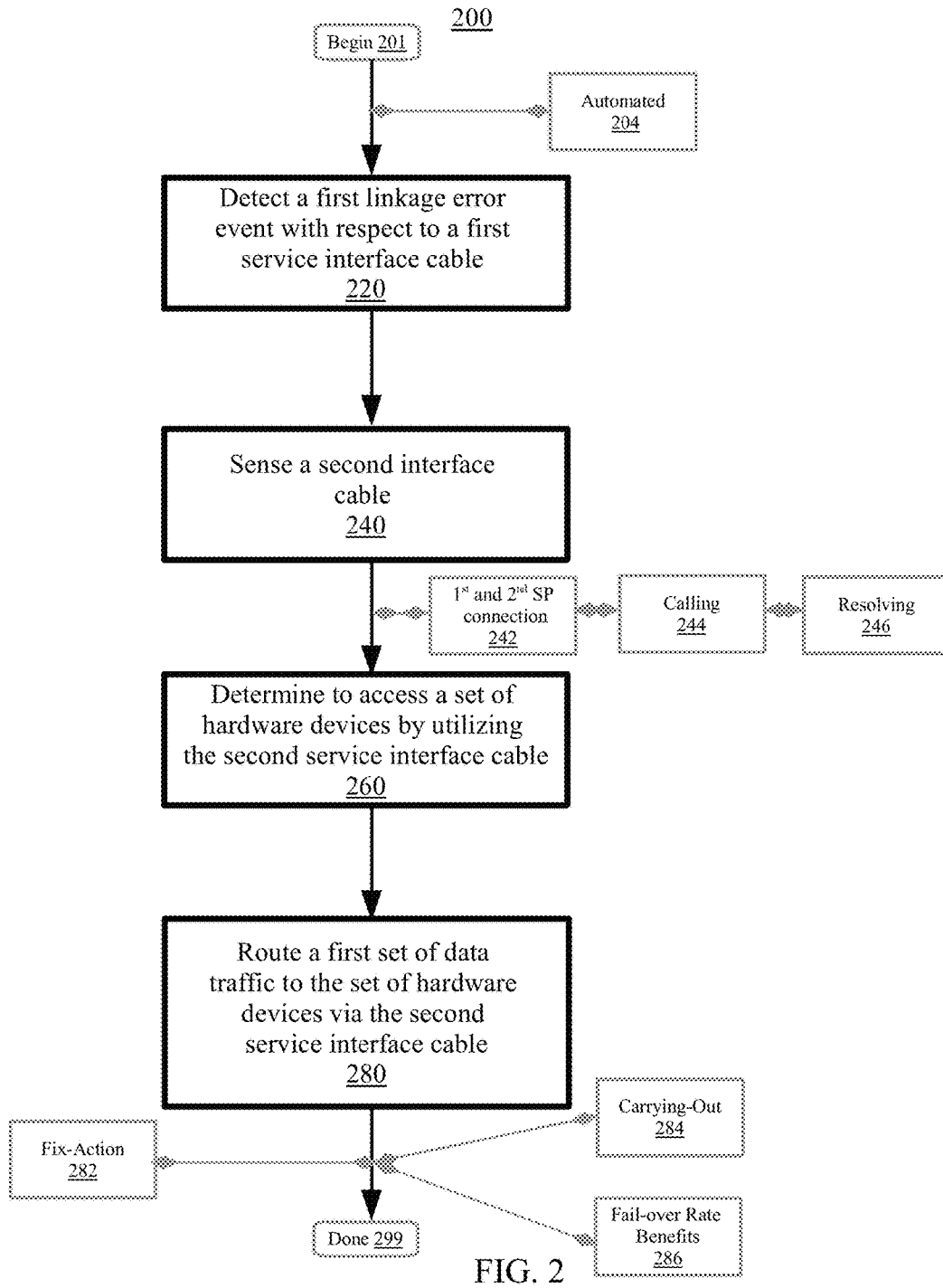
FIG. 2 is a flowchart illustrating a method for service interface typology management for a shared pool of configurable computing resources, according to embodiments.

FIG. 2 is a flowchart illustrating a method 200 for service interface typology management for a shared pool of configurable computing resources, according to embodiments. Service interface typology may include a schematic description of the arrangement of a network, including service processors, dual inline memory modules (DIMMS), server systems, other hardware and software components, and how they interface with one another (e.g., manage data traffic, error events). Generally, a service processor can include a specialized processor that monitors the operational state of a set of hardware devices using sensors, and provides remote management capabilities including console redirection, logging, and power control. The service processors of a network environment may use field-replaceable service interface (FSI) cables to communicate (e.g., transfer data traffic to and from) the set of hardware devices. The set of hardware devices can include storage devices, temperature sensors, fan controllers, memory devices, circuit boards, local service processors, field-replaceable units, compute nodes, and other hardware components of the network environment. Accordingly, aspects of method 200 relate to using a second service interface cable of a second (e.g., redundant) global service processer to provide access to a set of hardware devices rendered inaccessible to a first global service processor by a first linkage error event. Leveraging the link redundancy of the second global service processor may facilitate efficient management of data traffic and other hardware components of the server system as well as reduce the need for failover operations. The method 200 may begin at block 201.

In certain embodiments, the detecting, the sensing, the determining, the routing, and other steps described herein may each occur in an automated fashion without user intervention at block 204. In embodiments, the detecting, the sensing, the determining, the routing, and other steps described herein may be carried out by an internal service interface topology management module (e.g., management engine) maintained in a persistent storage device of a computing node that also includes the global service processor architecture. In certain embodiments, the steps described herein may be carried out by an external service interface topology management module hosted by a remote computing device or server (e.g., accessible via a subscription, usage-based, or other service model).

At block 220, a first linkage error event may be detected. The first linkage error event may be detected for a first set of data traffic with respect to a first service interface cable which connects a first global service processor with a set of hardware devices. The first linkage error event may be detected by a management engine. The management engine may include a hardware component or software module configured to facilitate operation of the first and second global service processors (e.g., data traffic routing, error event management). Generally, detecting can include monitoring for, recognizing, discovering, discerning, or otherwise identifying the first linkage error event. The first linkage error event can include a software or hardware failure, bug, glitch, defect, irregularity, or other occurrence that impairs, prevents, limits, or otherwise impacts transmission of the first set of data traffic (e.g., data packets and other information) between the first global service processor and the set of hardware devices. In embodiments, detecting the first linkage error event may include scanning the connection (e.g., the first service interface cable) between the first global service processor and the set of hardware devices, and discovering that the link between the first global service processor and one or more particular hardware devices of the set of hardware devices is inoperable or not functioning correctly, resulting in limited data transfer between the first global service processor and the particular hardware devices. As another example, detecting the first linkage error event may include tracking the first set of data traffic using a network traffic diagnostic tool, and identifying that the first set of data traffic did not successfully reach one or more destination hardware devices. Other methods of detecting the first linkage error event are also possible.

Consider the following example. The first global service processor may be configured to ping the set of hardware devices with the first set of data traffic, and receive a reply communication to verify the reachability of each individual hardware device of the set of hardware devices. Accordingly, the first global service processor may transmit the first set of data traffic to a set of hardware devices including a temperature sensor, a fan controller, a storage device, and a memory device using the first service interface cable. In embodiments, in response to pinging the set of hardware devices with the first set of data traffic, the first global service processor may receive a reply communication from one or more hardware devices of the set of hardware devices. For instance, the first global service processor may receive reply communications from the temperature sensor, the storage device, and the memory device. Accordingly, in embodiments, the first global service processor may identify that a reply communication was not received from the fan controller. As such, the first global service processor may detect a first linkage error event for the first set of data traffic with respect to the fan controller. Other methods of detecting the first linkage error event are also possible.

At block 240, a second interface cable may be sensed. The second service interface cable may connect a second global service processor with the set of hardware devices. The second interface service cable may be sensed by the management engine. Generally, sensing can include discovering, recognizing, ascertaining, or identifying the second service interface cable. As described herein, aspects of the disclosure relate to leveraging link redundancy of the second service interface cable to facilitate data communication and device access between the first global service processor and the set of hardware devices. In embodiments, sensing the second interface cable may include making use of a device manager to examine the physical hardware connections of the first global service processor, and identifying that the first global service processor is communicatively connected with a second global service processor that can access the set of hardware devices through the second service interface cable. For instance, sensing the second service interface cable may include transmitting a hardware verification request to the second global service processor to confirm that the second global service processor has access to the second service interface cable. In embodiments, the first global processor may also examine the second service interface cable to verify the available hardware device links of the second global service processor. Other methods of sensing the second service interface cable are also possible.

Consider the following example. In embodiments, a first global service processor may detect a first linkage error event with respect to a temperature sensor of the set of hardware devices (e.g., the connection between the temperature sensor and the first service interface cable may be malfunctioning). Accordingly, the first global service processor may send a request to the second global service processor to verify the connection status of the second service interface cable. In embodiments, the second global service processor may verify that the second service interface cable has a functional (e.g., stable, working, reliable) connection with the temperature sensor, and transmit a reply to the first global service processor indicating that the second service interface cable is functional and available for use by the first global service processor. As such, the second service interface cable may be sensed by the first global service processor. Other methods of sensing the second service interface cable are also possible.

In embodiments, as described herein, the first and second global service processors may be connected at block 242. Generally, the connection between the first and second global service processors may include a network link, communication channel, interface, or other method of facilitating data transfer and communication between the first and second global service processors. In embodiments, the first and second global service processors may both belong to the same local network infrastructure and communicate via a shared network connection. In embodiments, the first and second global service processors may belong to different local networks, and be connected to each other using a hardwired connection. Other types of connection between the first and second global service processors beyond those explicitly described herein are also possible.

In embodiments, the second global service processor may be called to access the set of hardware devices on behalf of the first global service processor at block 244. The second global service processor may be called by the management engine. Generally, calling can include contacting, sending a request, invoking, commanding, or instructing the second global service processor to access the set of hardware devices on behalf of the first global service processor. As described herein, aspects of the disclosure relate to utilizing the second service interface cable of the second global service processor to access one or more hardware devices not available to the first global service processor (e.g., due to a malfunctioning device connection of the first service interface cable). Accordingly, in embodiments, the management engine may instruct the second global service processor to access one or more hardware devices for the first global service processor. In embodiments, calling may include sending instructions to the second global service processor indicating which hardware devices are inaccessible to the first global service processor, and requesting that the second global service processor facilitate communication between the first global service processor and the indicated hardware devices using the second service interface cable. As an example, in the case where a first global service processor cannot access a memory device using the first service interface cable, the management engine may relay instructions to the second global service processer to verify its connection with the memory device, and allocate bandwidth resources for performing data transfer between the first global service processor and the memory device. Other methods of calling the second global service processor are also possible.

In embodiments, the management engine may resolve that the first service interface cable is not undergoing a replacement operation at block 246. Generally, resolving can include concluding, verifying, confirming, ascertaining, or otherwise determining that the first service interface cable is not undergoing a replacement operation. As described herein, aspects of the disclosure relate to configuring the second service interface cable to facilitate communication between the first global service processor and the set of hardware devices. Accordingly, in embodiments, aspects of the disclosure relate to verifying that the first service interface cable is not undergoing a replacement operation (e.g., in the event that the first service interface cable is undergoing a replacement operation, different configurations for the second service interface cable may be desirable). In embodiments, resolving may include accessing a database of scheduled network infrastructure modifications, and analyzing the database to determine that there is no scheduled replacement for the first service interface cable. As another example, in embodiments, the management engine may query a network administrator (e.g., via a dialogue box, electronic message) as to whether the first service interface cable is scheduled for replacement. Based on the response of the network administrator, the management engine may resolve that the first service interface cable is not scheduled to undergo a replacement operation. Other methods of resolving that the first service interface cable is not undergoing a replacement operation are also possible.

At block 260, the management engine may determine to access the set of hardware devices by utilizing the second service interface cable. Determining to access the set of hardware devices utilizing the second service interface cable may be performed based on and in response to the first linkage error event for the first set of data traffic. Generally, determining can include deciding, concluding, identifying, selecting, or otherwise ascertaining to access the set of hardware devices on behalf of the first global service processor using the second service interface cable. In embodiments, determining may include verifying that the configuration of the second global service processor and the second service interface cable are compatible with the requirements of the first global service processor. For instance, in embodiments, the linkage error event may be analyzed to ascertain which particular hardware component(s) have become inaccessible to the first global service processor, and the status of the second service interface cable may be inspected to confirm that the second global service processor maintains a functional connection with those particular hardware components. In embodiments, the management engine may perform additional examination techniques to verify that the hardware resource requirements, communication protocols, security stipulations, and other requirements of the first global service processor are achieved by the configuration of the second global service processor and the second service interface cable. In response to ascertaining that the requirements of the first global service processor are achieved, it may be determined to access the set of hardware devices by utilizing the second service interface cable. Other methods of determining to access the set of hardware devices using the second service interface cable are also possible.

Consider the following example. The first service interface cable of the first global service processor may attempt to transmit a first set of data traffic to a first storage device using a first service interface cable. In response to initiating transmission of the first set of data traffic, the first global service processor may encounter a first linkage error event that renders a first storage device inaccessible using the first service interface cable. Accordingly, the first global service processor may sense a second service interface cable (e.g., of the second global service processor). As described herein, the management engine may analyze the first linkage error event with respect to the configuration of the second global service processor, and ascertain that the second global service processor maintains a functional connection with the first storage device via the second service interface cable. Additionally, the management engine may inspect the first set of data traffic, and verify that the second service interface cable has the network bandwidth necessary to implement transfer of the first set of data traffic from the first global service processor to the first storage device. In response to ascertaining that the second service interface cable maintains a functional connection with the first storage device and the bandwidth requirements to achieve transfer of the first set of data traffic are achieved, the management engine may determine to utilize the second service interface cable to access the first storage device. Other methods of determining to access the set of hardware devices using the second service interface cable are also possible.

At block 280, the first set of data traffic may be routed to the set of hardware devices via the second service interface cable. The first set of data traffic may be routed to the set of hardware devices by the management engine. Generally, routing can include directing, sending, conducting, conveying, or otherwise transmitting the first set of data traffic to the set of hardware devices using the second service interface cable. In embodiments, routing the first set of data traffic may include forwarding the first set of data traffic to a particular hardware device of the set of hardware devices (e.g., the original intended recipient of the first set of data traffic that was not accessible to the first global service processor). In embodiments, routing may include designating a network path for the first set of data traffic that directs the first set of data traffic from the first global service processor through a network connection to the second global service processor, which then conducts the first set of data traffic to the set of hardware devices via the second service interface cable. As an example, a first set of data traffic that was originally intended to be transferred to a first memory device using the first service interface cable may be routed to the second global service processor, and subsequently forwarded to the first memory device using the second service interface cable. Other methods of routing the first set of data traffic to the set of hardware devices via the second service interface cable are also possible.

In embodiments, routing the first set of data traffic to the set of hardware devices via the second service interface cable may facilitate a fix action to the first service interface cable without executing a failover operation at block 282. The first set of data traffic may be all data traffic. Aspects of the disclosure relate to the recognition that, in certain situations, it may be desirable to perform a fix action such as a repair operation, component replacement, or other system reconfiguration with respect to the first service interface cable (e.g., to repair the malfunctioning connection between the first global service processor and one or more hardware devices). Accordingly, in certain embodiments, aspects of the disclosure relate to routing all data traffic between the set of hardware devices and both the first and second global service processors through the second service interface cable to facilitate the fix action to the first service interface cable (e.g., to reduce/prevent data loss). As an example, in embodiments, the management engine may analyze a database of scheduled infrastructure modifications, and determine a particular time at which a fix action is scheduled to be performed with respect to the first service interface cable. Prior to commencement of the fix action, the management engine may route all the data traffic handled by both the first and second global service processors to the set of hardware devices via the second service interface cable, and maintain this configuration until completion of the fix action. Upon completion of the fix action, the management engine may return the data traffic to its original network configuration. In embodiments, routing all the data traffic through the second service interface cable to facilitate the fix action may reduce the need for performance of a failover operation with respect to the first and second global service processors. Other methods of routing all the data traffic to the set of hardware devices via the second interface cable are also possible.

In embodiments, the surface interface typology management techniques described herein may be carried-out without executing a failover operation at block 284. Generally, carrying-out can include executing, implementing, or otherwise performing the surface interface typology management techniques. As described herein, in some situations, error events, bugs, malfunctions, or other irregularities may prevent the first global service processor from communicating with one or more hardware devices of the set of hardware devices. Traditionally, in such situations, failover operations (e.g., configuring a secondary service processor to perform the operations of the first global service processor) are one way of maintaining operation of the service processors and associated hardware components. Aspects of the disclosure relate to the recognition that failover operations may pose challenges including the cost of preparing the secondary service processor to perform the tasks of the first global service processor, the time to transfer necessary data from the first global service processor to the second, and maintaining hardware performance and data security during the failover operation. Accordingly, aspects of the disclosure relate to carrying-out the surface interface typology management techniques described herein (e.g., detecting a first linkage error event, sensing a second interface cable, determining to access a set of hardware devices utilizing the second interface cable, routing data traffic to the set of hardware devices via the second service interface cable) without executing a failover operation. As such, aspects of the disclosure relate to providing benefits (e.g., positive impacts) with respect to a failover rate of the first and second global service processors at block 286. In embodiments, utilizing the second service interface cable of the second global service processor to facilitate communication of the first set of data traffic between the first global service processor and the set of hardware devices may reduce the need for execution of a failure operation.

Consider the following example. A first linkage error event may be detected that inhibits transfer of a first set of data traffic between a first global service processor and a first memory unit of the set of hardware devices using a first service interface cable (e.g., a connector pin may be bent). The first global service processor may sense a second interface cable of the second global service processor, and the management engine may evaluate the nature of the first linkage error event with respect to the configuration of the second global service processor. The management engine may ascertain that the second global service processor maintains a functional connection with the first memory unit, and also that the second service interface cable achieves the bandwidth requirements needed to perform transfer of the first set of data traffic. Accordingly, the first set of data traffic may be routed to the first memory unit via the second service interface cable. Other methods of facilitating communication between the first global service processor and the set of hardware devices are also possible.

Method 200 concludes at block 299. Aspects of method 200 may provide performance or efficiency benefits for service interface typology management for a shared pool of configurable computing resources. For example, aspects of method 200 may have positive impacts with respect to facilitating network communication between a first global service processor and a set of hardware devices using a second service interface cable. As described herein, the detecting, sensing, determining, and routing described herein may each occur in an automated fashion without user intervention. Altogether, leveraging service interface link redundancy may facilitate efficient management of service processors and other hardware components as well as reduce the need for failover operations.

Figure 3:
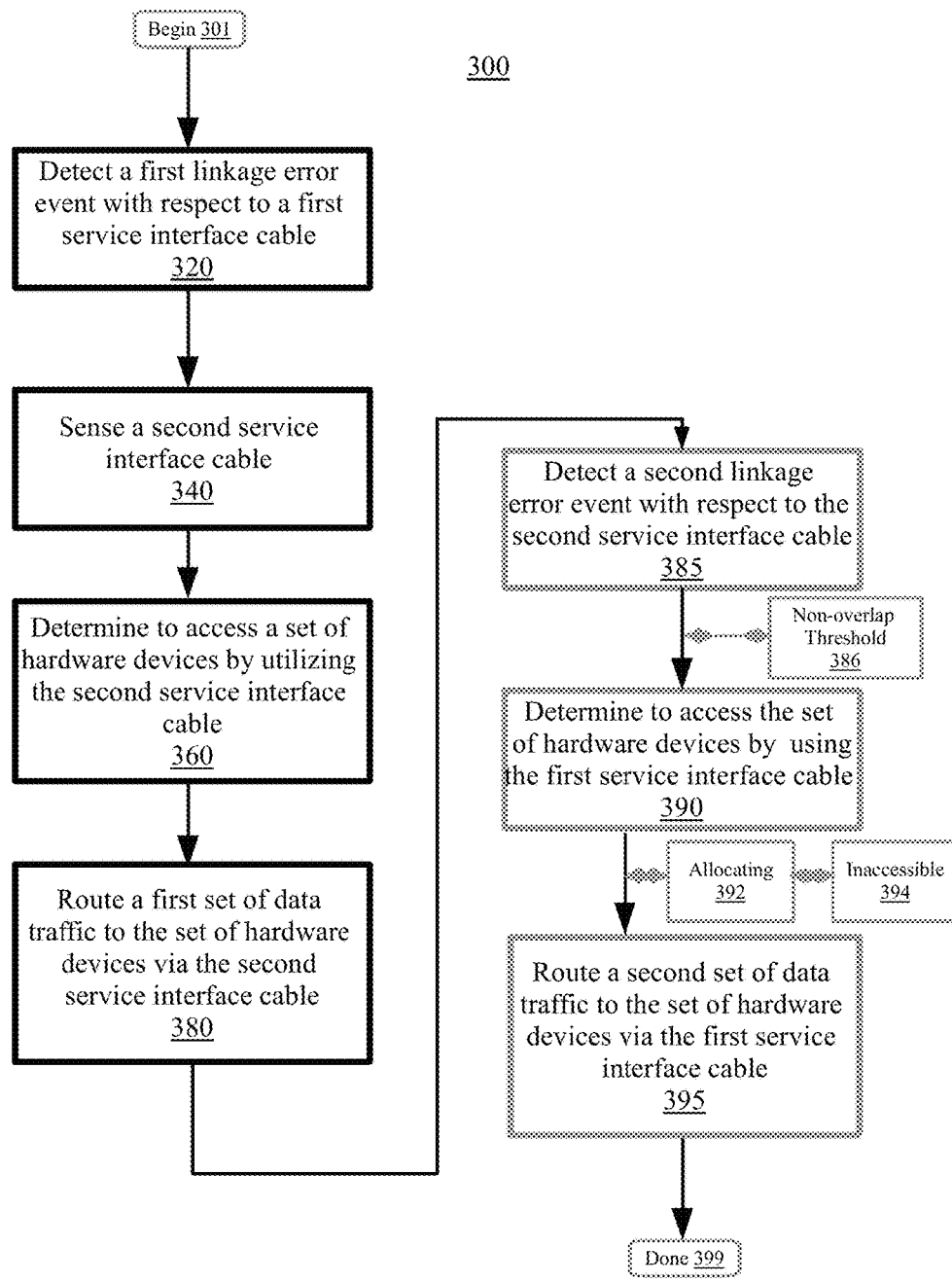
FIG. 3 is a flowchart illustrating a method for service interface typology management for a shared pool of configurable computing resources, according to embodiments.

FIG. 3 is a flowchart illustrating a method 300 for service interface typology management for a shared pool of configurable computing resources, according to embodiments. In embodiments, aspects of the disclosure relate to the recognition that, in certain situations, multiple service processors of a particular network environment may encounter linkage error events with respect to their respective service interface cables. Accordingly, aspects of method 300 relate to managing a second linkage error event to facilitate network communication between first and second global service processors and a set of hardware devices of the network environment. In embodiments, aspects of the method 300 may substantially correspond to other embodiments described herein and the FIGS. 1-7. At block 320, a first linkage error event with respect to a first service interface cable may be detected. At block 340, a second service interface cable may be sensed. At block 360, it may be determined to access a set of hardware devices by utilizing the second service interface cable. At block 380, a first set of data traffic may be routed to the set of hardware devices via the second service interface cable. The method 300 may begin at block 301.

In embodiments, a second linkage error event with respect to the second service interface cable may be detected at block 385. The second linkage error event may be detected for a second set of data traffic with respect to the second service interface cable which connects the second global service processor with the set of hardware devices. The second linkage error event may be detected by a management engine. Generally, detecting can include monitoring for, recognizing, discovering, discerning, or otherwise identifying the second linkage error event. The second linkage error event can include a software or hardware failure, bug, glitch, defect, irregularity, or other occurrence that impairs, prevents, limits, or otherwise impacts transmission of the second set of data traffic (e.g., data packets, information) between the second global service processor and the set of hardware devices. In embodiments, detecting the second linkage error event may include receiving an error notification from the second global service processor that indicates that one or more hardware devices of the set of hardware devices has become unavailable (e.g., unable to receive data traffic, unresponsive). As an example, the management engine may receive an error notification indicating that a particular compute node of the network environment has become unresponsive and a second linkage error event has been detected. Other methods of detecting the second linkage error event are also possible.

In embodiments, the first and second linkage error events may achieve a non-overlap threshold at block 386. Generally, the non-overlap threshold can include a criterion, requirement, or benchmark that indicates that the first linkage error event does not substantially correspond to the second linkage error event. In embodiments, the non-overlap threshold may be determined to be achieved as long as the first and second linkage error events were not encountered with respect to the same hardware device. As an example, a first linkage error event that occurred with respect to a fan controller and a second linkage event that occurred with respect to a storage device may be considered to achieve the non-overlap threshold. As another example, a first linkage error event and a second linkage error event that both occur with respect to a first storage device may be considered to fail to achieve the non-overlap criterion. Aspects of the disclosure, in embodiments, relate to leveraging service interface cable link redundancy to facilitate communication between service processors and hardware devices that encounter linkage error events that achieve the overlap criterion. Other types of non-overlap criterion beyond those described explicitly herein are also possible.

In embodiments, the management engine may determine to access the set of hardware devices by utilizing the first service interface cable at block 390. Determining to access the set of hardware devices utilizing the first service interface cable may be performed based on and in response to the second linkage error event for the second set of data traffic. Generally, determining can include deciding, concluding, identifying, selecting, or otherwise ascertaining to access the set of hardware devices on behalf of the second global service processor using the first service interface cable. In embodiments, determining may include analyzing the nature of the second linkage error event (e.g., causes/triggering parameters, past occurrences, solutions) and ascertaining which particular device(s) have been affected by the second linkage error event. In embodiments, the management engine may examine the second linkage error event in association with the first service interface cable and the first global service processor to verify that the first global service processor maintains a functional connection with the one or more hardware devices impacted by the second linkage error event. In response to ascertaining that the first service interface cable can be used to facilitate communication (e.g., data transfer) between the second global service processor and the one or more hardware devices affected by the second linkage error event, the management engine may determine to access the set of hardware devices by utilizing the first service interface cable. Other methods of determining to access the set of hardware devices via the first service interface cable are also possible.

In embodiments, a group of data traffic may be allocated into the first and second sets of data traffic to access the set of hardware devices at block 392. The group of data traffic may be allocated by utilizing both the first and second service interface cables. The group of data traffic can include a batch, bundle, or other collection of data packets or information configured to be delivered to one or more hardware devices of the set of hardware devices (e.g., from the first or second global service processor). Generally, allocating can include assigning, allotting, designating, transmitting, routing, dividing, apportioning, splitting, or otherwise specifying the group of data traffic for inclusion into the first and second sets of data traffic to access the set of hardware devices. In embodiments, allocating may include distributing the group of data traffic between the first and second service interface cables so as to leverage the functional hardware connections of each service interface cable. As an example, consider a situation in which a first compute node is inaccessible using the first service interface cable, and a second memory device is inaccessible using the second service interface cable (e.g., as a result of a first and second linkage error events). Accordingly, a group of data traffic may be allocated such that data from the first global service processor is directed to the first compute node using the second service interface cable, and data from the second global service processor is directed to the second memory device using the first service interface cable. Other methods of allocating the group of data to access the set of hardware devices utilizing both the first and second service interface cables are also possible.

In embodiments, aspects of the disclosure relate to a network environment in which at least a portion of the set of hardware devices is inaccessible by both the first and second global service processors without splitting the group of data traffic at block 394. In embodiments, aspects of the disclosure relate to leveraging service interface link redundancy to facilitate network communication between service processors and other hardware components in a network environment in which one or more hardware devices are inaccessible without utilizing both the first and second service interface cables. As an example, consider a network environment in which a first linkage error event prevents network communication between the first global service processor and a first compute node, and a second linkage error event prevents network communication between the second global service processor and a second compute node. In such a situation, the first compute node will remain inaccessible to the first global service processor and the second compute node will remain inaccessible to the second global service processor unless link redundancy between the two service interface cables is utilized. Accordingly, as described herein, both the first and second service interface cables may be utilized to facilitate reachability between both the first and second service processors and the set of hardware devices.

In embodiments, the second set of data traffic may be routed to the set of hardware devices via the first service interface cable at block 395. The second set of data traffic may be routed to the set of hardware devices by the management engine. Generally, routing can include directing, sending, conducting, conveying, or otherwise transmitting the second set of data traffic to the set of hardware devices using the first service interface cable. In embodiments, routing may include conducting the second set of data traffic to a particular hardware device of the set of hardware devices (e.g., the original intended recipient of the second set of data traffic that was not accessible to the second global service processor). As an example, routing the second set of data traffic may include transmitting instructions, data packets, commands or other information from the second global service processor to a particular hardware device using the first service interface cable. Other methods of routing the first set of data traffic to the set of hardware devices via the first service interface cable are also possible. The method 300 may conclude at block 399.

Consider the following example. A particular network environment may include a set of hardware devices including a first storage device, a second storage device, a first memory device, a second memory device, a cooling fan, and a temperature sensor. In embodiments, the first global service processor may encounter a first linkage error event that impairs transfer of a first set of data to the second memory device and the temperature sensor using the first service interface cable. The second global service processor may encounter a second linkage error event that impairs transfer of a second set of data to the first storage device and the cooling fan using the second service interface cable. In embodiments, the first and second global service processors may submit requests to each other to ascertain the operational status of one another's hardware connections (e.g., which hardware devices are accessible using the other service processor's service interface cable). Accordingly, the first global service processor may ascertain that the second memory device and the temperature sensor are both accessible via the second service interface cable, and the second global service processor may ascertain that the first storage device and the cooling fan are both accessible via the first service interface cable. As such, the first set of data may be routed from the first global service processor to the second memory device and the temperature sensor using the second service interface cable, and the second set of data may be routed from the second global service processor to the first storage device and the cooling fan using the first service interface cable. Other methods of managing link redundancy to facilitate network communication in network environments associated with multiple linkage error events are also possible.

Figure 4:
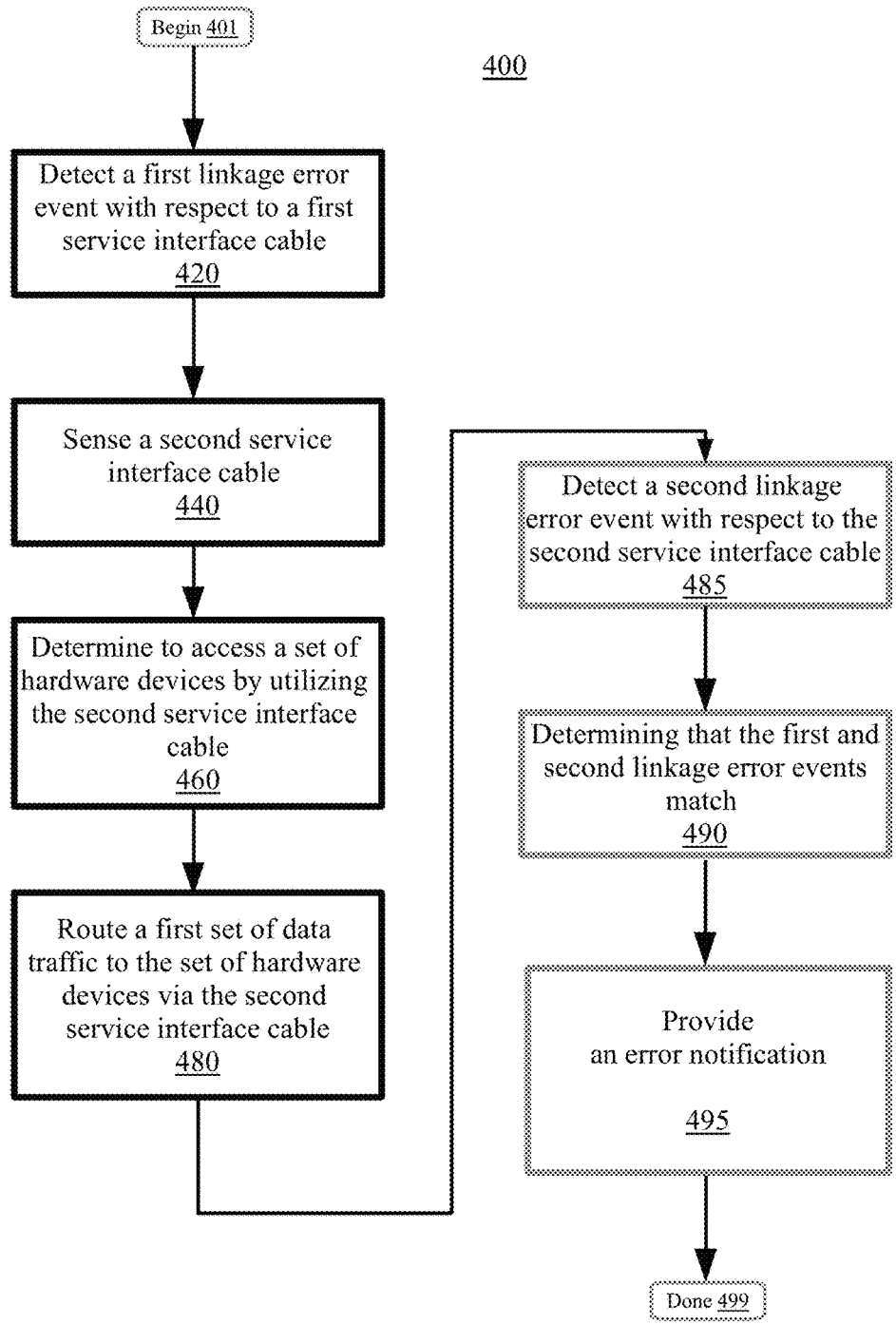
FIG. 4 is a flowchart illustrating a method for service interface typology management for a shared pool of configurable computing resources, according to embodiments.

FIG. 4 is a flowchart illustrating a method 400 for service interface typology management for a shared pool of configurable computing resources, according to embodiments. In embodiments, aspects of the disclosure relate to the recognition that, in certain situations, multiple linkage error events may occur with respect to the same hardware device of the set of hardware devices (e.g., impacting the effect of link redundancy). Accordingly, aspects of method 400 relate to determining that a first and second linkage error event substantially correspond, and providing an error notification (e.g., requesting service interface cable replacement). In embodiments, aspects of the method 400 may substantially correspond to other embodiments described herein and the FIGS. 1-7. At block 420, a first linkage error event with respect to a first service interface cable may be detected. At block 440, a second service interface cable may be sensed. At block 460, it may be determined to access a set of hardware devices by utilizing the second service interface cable. At block 480, a first set of data traffic may be routed to the set of hardware devices via the second service interface cable. The method 400 may begin at block 401.

In embodiments, a second linkage error event with respect to the second service interface cable may be detected at block 485. The second linkage error event may be detected for a second set of data traffic with respect to the second service interface cable which connects the second global service processor with the set of hardware devices. The second linkage error event may be detected by a management engine. Generally, detecting can include monitoring for, recognizing, discovering, discerning, or otherwise identifying the second linkage error event. The second linkage error event can include a software or hardware failure, bug, glitch, defect, irregularity, or other occurrence that impairs, prevents, limits, or otherwise impacts transmission of the second set of data traffic between the second global service processor and the set of hardware devices. In embodiments, detecting the second linkage error event may include receiving an error notification from the second global service processor that indicates that one or more hardware devices of the set of hardware devices has become unavailable (e.g., unable to receive data traffic, unresponsive). As an example, the management engine may receive an error notification indicating that a particular compute node of the network environment has become unresponsive and a second linkage error event has been detected. Other methods of detecting the second linkage error event are also possible.

In embodiments, the management engine may determine that the first and second linkage error events match at block 490. Determining that the first and second linkage error events match may be performed based on and in response to the second linkage error event for the second set of data traffic. Generally, determining can include deciding, concluding, identifying, selecting, or otherwise ascertaining that the first and second linkage error events match. In embodiments, determining may include comparing the triggering parameters, severity, effect, impacted device, and other information for both the first and second linkage error events, and concluding that the first and second linkage error events achieve a similarity threshold (e.g., quantitative or qualitative criterion specifying a degree of similarity, correlation, or correspondence between the first and second linkage error events). In embodiments, determining may include ascertaining that the first and second linkage error events occurred with respect to the same hardware device. As an example, consider that the first global service processor encounters a first linkage error event that limits data transfer to a particular storage device using the first service interface cable, and the second global service processor encounters a second linkage error event that limits data transfer to the same particular storage device using the second service interface cable. In embodiments, the first and second linkage error events may be compared and it may be determined that, as both linkage error events impact the storage device, the first and second linkage error events match. Other methods of determining that the first and second linkage error events match are also possible.

In embodiments, an error notification may be provided by the management engine at block 495. Generally, providing can include presenting, displaying, warning, demonstrating, notifying, or otherwise conveying the error notification. In embodiments, providing the error notification may include alerting a network administrator or other user of the first and second linkage error events. In certain embodiments, the error notification may include information such as the time and date that the linkage error events occurred, the severity of the errors, causes, impacted hardware devices, potential solutions, past occurrence instances, and other data regarding the first and second linkage error events. In embodiments, the error notification may recommend that either the first or second service interface cables be replaced (e.g., to restore network communication between the global service processors and the set of hardware devices). In embodiments, providing the error notification may include displaying a dialogue box on a computer monitor, transferring an electronic message to a particular compute node, or otherwise providing indication of the first and second linkage error events. Other methods of providing the error notification are also possible. The method 400 may conclude at block 499.

Consider the following example. A particular network environment may include a set of hardware devices including a first storage device, a second storage device, a first memory device, a second memory device, a cooling fan, and a temperature sensor. The first global service processor may encounter a first linkage error event that results in the first storage device becoming inaccessible using the first service interface cable. In certain embodiments, the second global service processor may encounter a second linkage error event that also results in the first storage device becoming inaccessible using the second service interface cable. Accordingly, in response to detecting the first and second linkage error events, the management engine may analyze the operational status of both the first and second global service processors with respect to the set of hardware devices, and ascertain that the first and second linkage error events match (e.g., as they both impact the first storage device). As such, the management engine may generate an error notification recommending replacement of one or both of the first and second service interface cables, and provide the error notification to an administrator for the network environment.

Figure 5:
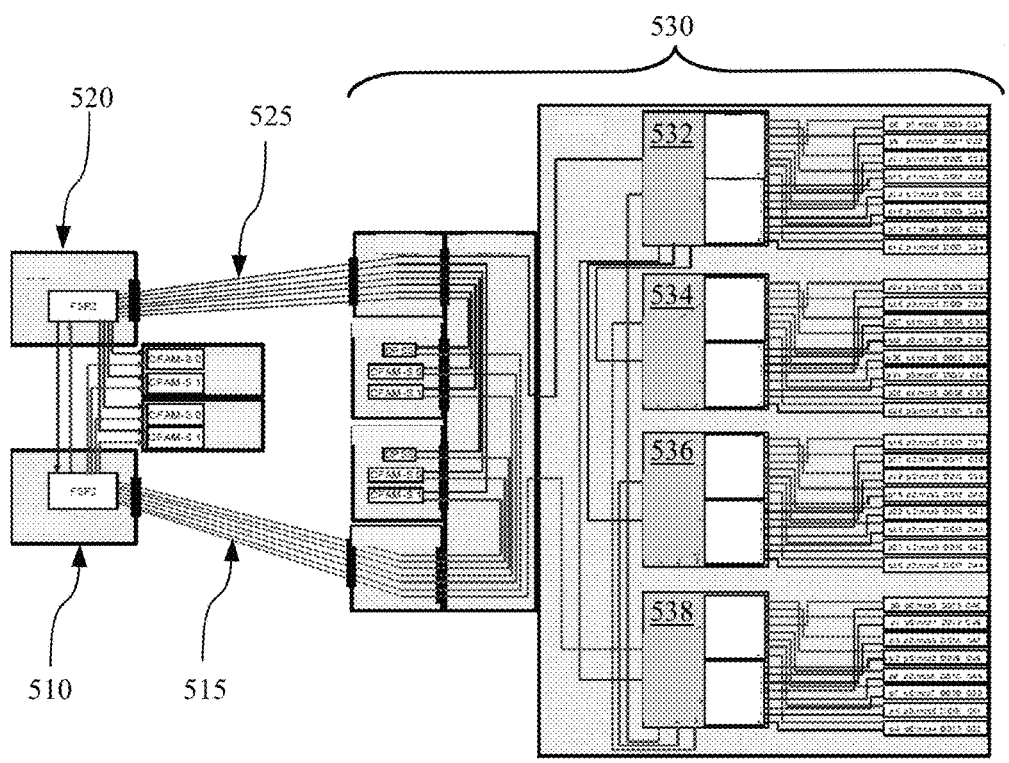
FIG. 5 illustrates an example system infrastructure for illustrating aspects of the disclosure, according to embodiments.

FIG. 5 illustrates an example system infrastructure 500 for illustrating aspects of the disclosure, according to embodiments. Aspects of the system infrastructure 500 relate to a network environment configured to leverage redundancy of service interface cable hardware connections to facilitate communication between service processors and hardware devices in the case of linkage error events. Accordingly, as described herein, the system infrastructure 500 may include a first global service processor 510 and a second global service processor 520. The first global service processor 510 and the second global service processor 520 may include specialized processors configured to monitor the operational status of a set of hardware devices using sensors, and provide remote management capabilities including console redirection, logging, and power control. In embodiments, the first global service processor 510 may be communicatively connected to a set of hardware devices 530 via a first service interface cable 515, and the second global service processor 520 may be communicatively connected to the set of hardware devices 530 via a second service interface cable 525. The first and second service interface cables 515, 525 may facilitate network communication and data transfer between the first and second global service processors and the set of hardware devices 530, respectively. The set of hardware devices 530 can include storage devices, temperature sensors, fan controllers, memory devices, circuit boards, local service processors, field-replaceable units, compute nodes, and other hardware components of the network environment. In embodiments, the set of hardware devices 530 may include a first processor node 532, a second processor node 534, a third processor node 536, and a fourth processor node 538. Other methods of structuring the system infrastructure 500 are also possible.

In embodiments, as described herein, the system infrastructure 500 may facilitate communication between service processors and hardware devices in the case of linkage error events. For example, in the event that the first global service processor 510 encounters a linkage error event that impairs network communication between the first global service processor 510 and the third processor node 536 using the first service interface cable 515, the first global service processor 510 may call the second global service processor 520 and verify that the second global service processor 520 maintains a functional connection with the third processor node 536 via the second service interface cable. Accordingly, in response to ascertaining that the second global service processor 520 remains connected with the third processor node 536 using the second service interface cable, the first global service processor 510 may be configured to direct a set of data traffic to the third processor node 536 via the second service interface cable 525. Other methods of handling the linkage error event are also possible.

Figure 6:
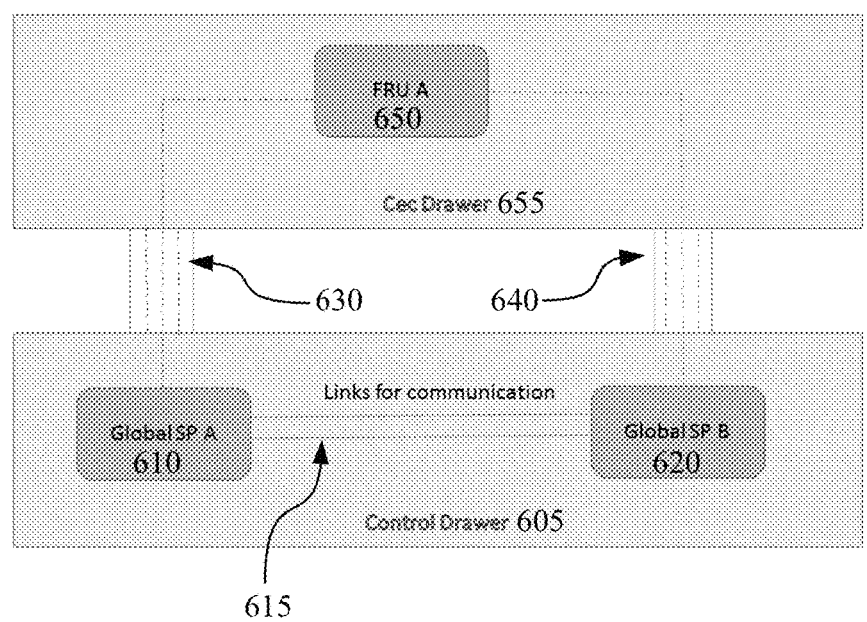
FIG. 6 illustrates an example system infrastructure for illustrating aspects of the disclosure, according to embodiments.

FIG. 6 illustrates an example system infrastructure 600 for illustrating aspects of the disclosure, according to embodiments. Aspects of the system infrastructure 600 relate to a network environment including a control drawer 605 and a Central Electronics Complex (CEC) drawer 655. The control drawer may house the service and control hardware for multi-node system servers (on certain single node servers the same enclosure may contain both the control and compute hardware). In particular, the control drawer can house one or more service processors (and hence the software components with the service processor). The control drawer may be connected to the CEC nodes via service interface cables (e.g., FSI cables). Generally, the control drawer 605 and the CEC drawer 655 may include structural components for housing the hardware devices of the network environment and facilitating network communication and data transfer between individual hardware devices. In embodiments, the control drawer 605 can include a first global service processor 610 and a second global service processor 620, as well as communication connections 615 for performing data transfer between the first global service processor 610 and the second global service processor 620. As shown in FIG. 6, the first global service processor 610 may be connected to a field replaceable unit 650 via a first service interface cable 630, and the second global service processor 620 may be connected to the field replaceable unit 650 via a second service interface cable 640. The field replaceable unit 650 can include a circuit board, part, or assembly located within the CEC drawer 655. In embodiments, the CEC drawer 655 can include a housing for the processor, memory, I/O hub, system clock, and other associated hardware devices of the system infrastructure. As described herein, the system infrastructure 600 may leverage redundancy of service interface cable hardware connections to facilitate communication between service processors and hardware devices in the case of linkage error events.

Figure 7:
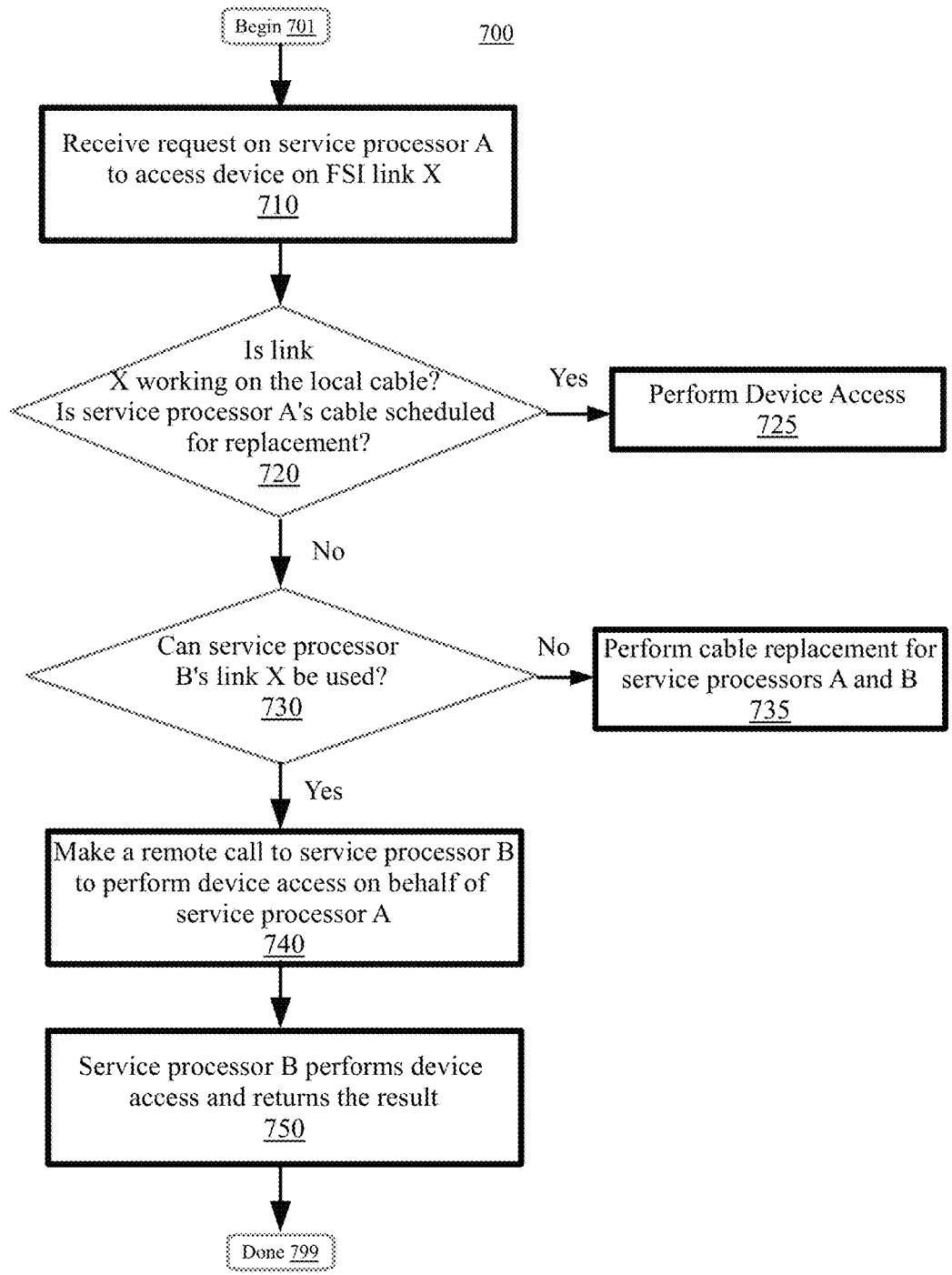
FIG. 7 is a flowchart illustrating a method for service interface typology management for a shared pool of configurable computing resources, according to embodiments.

FIG. 7 is a flowchart illustrating a method 700 for service interface typology management for a shared pool of configurable computing resources, according to embodiments. Aspects of FIG. 7 relate to establishing network communication between a service processor A and a field-replaceable-unit service interface link X (FSI) by using a redundant link of a second service processor B. The FSI link X may be a particular communicative connection between a service processor and a particular hardware device (e.g., storage device, memory device, temperature sensor). The method 700 may begin at block 701.

In embodiments, service processor A may receive a request to access a specified hardware device using a particular FSI link X at block 710. At block 720, it may be determined whether or not FSI link X is working (e.g., functional, operational) on the local cable (e.g., first service interface cable) for service processor A. Additionally, it may be ascertained whether or not service processor A's service interface cable is scheduled for replacement (e.g., based on a database of scheduled network infrastructure modifications). In response to verifying that the service interface cable of service processor A is working correctly or scheduled for replacement, the method may proceed to block 725 and device access may be performed using FSI link X of service processor A's service interface cable.

In response to determining that FSI link X is not working on service processor A's service interface cable and that the cable is not scheduled for replacement, it may be determined whether or not FSI link X is functional on the service interface cable for service processor B at block 730. In the event that FXI link X cannot be used on service processor B, cable replacement may be performed for service processors A and B at block 735. In the event that FSI link X can be used on the service interface cable for processor B, the method 700 may proceed to block 740. At block 740, service processor A may make a remote call (e.g., request) to service processor B to perform device access on behalf of service processor A. At block 750, service processor B may perform device access using FSI link X of service processor B's service interface cable. Other methods of establishing network communication between service processor A and one or more hardware devices using link redundancy provided by service processor B are also possible. The method 700 may conclude at block 799.

In addition to embodiments described above, other embodiments having fewer operational steps, more operational steps, or different operational steps are contemplated. Also, some embodiments may perform some or all of the above operational steps in a different order. The modules are listed and described illustratively according to an embodiment and are not meant to indicate necessity of a particular module or exclusivity of other potential modules (or functions/purposes as applied to a specific module).

In the foregoing, reference is made to various embodiments. It should be understood, however, that this disclosure is not limited to the specifically described embodiments. Instead, any combination of the described features and elements, whether related to different embodiments or not, is contemplated to implement and practice this disclosure. Many modifications and variations may be apparent to those of ordinary skill in the art without departing from the scope and spirit of the described embodiments. Furthermore, although embodiments of this disclosure may achieve advantages over other possible solutions or over the prior art, whether or not a particular advantage is achieved by a given embodiment is not limiting of this disclosure. Thus, the described aspects, features, embodiments, and advantages are merely illustrative and are not considered elements or limitations of the appended claims except where explicitly recited in a claim(s).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Embodiments according to this disclosure may be provided to end-users through a cloud-computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud-computing resources are provided to a user on a pay-per-use basis, where users are charged only for the computing resources actually used (e.g., an amount of storage space used by a user or a number of virtualized systems instantiated by the user). A user can access any of the resources that reside in the cloud at any time, and from anywhere across the Internet. In context of the present disclosure, a user may access applications or related data available in the cloud. For example, the nodes used to create a stream computing application may be virtual machines hosted by a cloud service provider. Doing so allows a user to access this information from any computing system attached to a network connected to the cloud (e.g., the Internet).

Embodiments of the present disclosure may also be delivered as part of a service engagement with a client corporation, nonprofit organization, government entity, internal organizational structure, or the like. These embodiments may include configuring a computer system to perform, and deploying software, hardware, and web services that implement, some or all of the methods described herein. These embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to exemplary embodiments, other and further embodiments of the invention may be devised without departing from the basic scope thereof, and the scope thereof is determined by the claims that follow. The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer-implemented method of service interface topology management for a shared pool of configurable computing resources, the method comprising:
   detecting, by a management engine, a first linkage error event for a first set of data traffic with respect to a first service interface cable which connects a first global service processor with a set of hardware devices;
   sensing, by the management engine, a second service interface cable which connects a second global service processor with the set of hardware devices;
   determining, by the management engine, based on and in response to the first linkage error event for the first set of data traffic, to access the set of hardware devices by utilizing the second service interface cable, wherein determining to access the set of hardware devices by utilizing the second service interface cable includes (i) examining, by the management engine, the first linkage error event with respect to a communication configuration of the second global service processor; and (ii) ascertaining, based on examining the first linkage error event with respect to the communication configuration of the second global service processor, that the second global service processor achieves a communication threshold for the set of hardware devices using the second service interface cable; and
   routing, by the management engine, the first set of data traffic to the set of hardware devices via the second service interface cable.

2. The method of claim 1, further comprising:
  detecting, by the management engine, a second linkage error event for a second set of data traffic with respect to the second service interface cable which connects the second global service processor with the set of hardware devices;
  determining, by the management engine, based on and in response to the second linkage error event for the second set of data traffic, to access the set of hardware devices by utilizing the first service interface cable; and
  routing, by the management engine, the second set of data traffic to the set of hardware devices via the first service interface cable.

3. The method of claim 2, wherein the first and second linkage error events achieve a non-overlap threshold.

4. The method of claim 3, further comprising:
  allocating, by utilizing both the first and second service interface cables, a group of data traffic into the first and second sets of data traffic to access the set of hardware devices.

5. The method of claim 4, wherein at least a portion of the set of hardware devices is inaccessible by both the first and second global service processors without splitting the group of data traffic.

6. The method of claim 1, further comprising:
  carrying-out the service interface topology management without executing a failover operation.

7. The method of claim 1, wherein the first and second global service processors are connected.

8. The method of claim 7, further comprising:
  calling, by the management engine, the second global service processor to access the set of hardware devices on behalf of the first global service processor.

9. The method of claim 8, further comprising:
  resolving, by the management engine, that the first service interface cable is not undergoing a replacement operation.

10. The method of claim 1, wherein the first set of data traffic is all data traffic, and wherein routing the first set of data traffic to the set of hardware devices via the second service interface cable facilitates a fix action to the first service interface cable without executing a failover operation.

11. The method of claim 1, further comprising:
  detecting, by the management engine, a second linkage error event for a second set of data traffic with respect to the second service interface cable which connects the second global service processor with the set of hardware devices;
  determining, by the management engine, based on and in response to the second linkage error event for the second set of data traffic, that the first and second linkage error events match; and
  providing, by the management engine, an error notification.

12. The method of claim 1, wherein the shared pool of configurable computing resources includes a control drawer having the management engine.

13. The method of claim 1, wherein the service interface topology management benefits a failover rate of the first and second global service processors.

14. The method of claim 1, wherein the detecting, the sensing, the determining, and the routing each occur in an automated fashion without user intervention.

15. The method of claim 1, wherein the communication configuration of the second global service processor includes an operational status of the second service interface cable with respect to the set of hardware devices.

16. A system for service interface topology management of a shared pool of configurable computing resources, the system comprising:
  a memory having a set of computer readable computer instructions, and
  a processor for executing the set of computer readable instructions, the set of computer readable instructions including:
  detecting, by a management engine, a first linkage error event for a first set of data traffic with respect to a first service interface cable which connects a first global service processor with a set of hardware devices;
  sensing, by the management engine, a second service interface cable which connects a second global service processor with the set of hardware devices;
  determining, by the management engine, based on and in response to the first linkage error event for the first set of data traffic, to access the set of hardware devices by utilizing the second service interface cable, wherein determining to access the set of hardware devices by utilizing the second service interface cable includes (i) examining, by the management engine, the first linkage error event with respect to a communication configuration of the second global service processor; and (ii) ascertaining, based on examining the first linkage error event with respect to the communication configuration of the second global service processor, that the second global service processor achieves a communication threshold for the set of hardware devices using the second service interface cable; and
  routing, by the management engine, the first set of data traffic to the set of hardware devices via the second service interface cable.

17. A computer program product for service interface topology management of a shared pool of configurable computing resources, the computer program product comprising a computer readable storage medium having program instructions embodied therewith, wherein the computer readable storage medium is not a transitory signal per se, the program instructions executable by a processor to cause the processor to perform a method comprising:
  detecting, by a management engine, a first linkage error event for a first set of data traffic with respect to a first service interface cable which connects a first global service processor with a set of hardware devices;
  sensing, by the management engine, a second service interface cable which connects a second global service processor with the set of hardware devices;
  determining, by the management engine, based on and in response to the first linkage error event for the first set of data traffic, to access the set of hardware devices by utilizing the second service interface cable, wherein determining to access the set of hardware devices by utilizing the second service interface cable includes (i) examining, by the management engine, the first linkage error event with respect to a communication configuration of the second global service processor; and (ii) ascertaining, based on examining the first linkage error event with respect to the communication configuration of the second global service processor, that the second global service processor achieves a communication threshold for the set of hardware devices using the second service interface cable; and routing, by the management engine, the first set of data traffic to the set of hardware devices via the second service interface cable.

18. The computer program product of claim 17, wherein at least one of:
- the program instructions are stored in the computer readable storage medium in a data processing system, and wherein the program instructions were downloaded over a network from a remote data processing system; or
- the program instructions are stored in the computer readable storage medium in a server data processing system, and wherein the program instructions are downloaded over a network to the remote data processing system for use in a second computer readable storage medium with the remote data processing system.

* * * * *